(No Model.)
J. A. SEYMOUR.
COMBINED RELIEF VALVE AND CYLINDER COCK.
No. 382,329. Patented May 8, 1888.
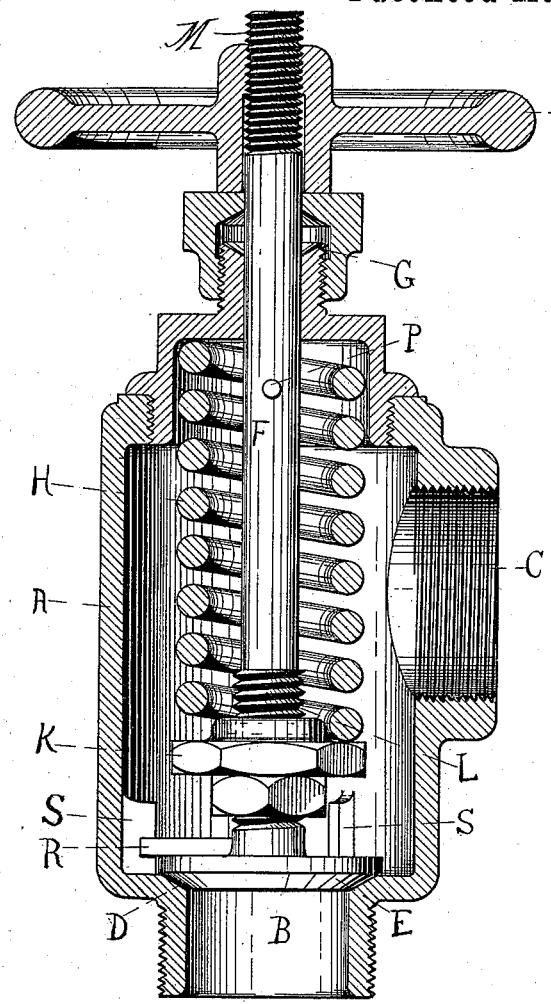
Witnesses:
Inventor:
James A. Seymour,
by Frederick J. Allen,
Attorney.

UNITED STATES PATENT OFFICE.

JAMES A. SEYMOUR, OF AUBURN, NEW YORK.

COMBINED RELIEF-VALVE AND CYLINDER-COCK.

SPECIFICATION forming part of Letters Patent No. 382,329, dated May 8, 1888.

Application filed March 21, 1887. Serial No. 231,797. (No model.)

*To all whom it may concern:*

Be it known that I, JAMES A. SEYMOUR, of the city of Auburn, State of New York, have invented certain new and useful Improvements in Combined Relief-Valves and Cylinder-Cocks, of which the following is a description, reference being had to the accompanying drawing.

The object of my invention is to furnish a simple mechanism possessing at the same time the functions of a relief-valve and of an engine cylinder-cock. This object is attained by the use of the mechanism herein described, and this is so constructed that as a relief-valve it will open to relieve any undue pressure in the cylinder at any definite amount of pressure which may have been before determined upon, and which amount is adjustable at will, but which is not changed nor disturbed by its use as a cylinder-cock, while at the same time as a cylinder-cock it is capable of being opened at will, and will then remain open until closed at the will of the operator.

My invention consists of a body portion, A, provided with an ingress-opening, B, and an egress opening, C. A valve-seat, D, is provided, upon which the valve E is seated, and which valve is furnished with a valve-stem, F, which passes through a stuffing-box, G. In order that this mechanism may operate as a relief-valve, it is pressed upon the valve-seat by the spring H, which is coiled around the valve-stem, and which rests upon an adjustable nut, K, which may be set at the required position to compress the spring H to the proper degree by raising or lowering it upon the screw-thread L upon the valve-stem. The valve-stem is also screw-threaded at M to receive the hand-wheel N, bearing the counterpart thread, so that by revolving the hand-wheel the valve is raised from its seat against the pressure of the spring H, and will remain open at any point at which it may be set. A pin, P, projecting through the stem limits the amount which the valve may be raised from its seat, and a lug, R, upon the valve, by striking against one of the flanges S, projecting inwardly from the wall of the body portion A, prevents the valve from turning around its stem.

Having thus described my invention, what I claim as new, and desire to secure by Letters Patent, is—

The combination of the valve E, valve-seat D, spring H, and valve-stem F, provided with one screw-thread within the body of the valve and another outside thereof, the former having a set-nut, K, upon it, and the latter having a threaded hand-wheel, N, upon it, whereby the valve E may be raised and set at any desired point above its seat, so that it may operate either as a relief-valve or as a cock at will.

JAMES A. SEYMOUR.

Witnesses:
GEORGE UNDERWOOD,
FREDERICK I. ALLEN.